United States Patent
Gorobets

(10) Patent No.: US 7,480,766 B2
(45) Date of Patent: Jan. 20, 2009

(54) INTERFACING SYSTEMS OPERATING THROUGH A LOGICAL ADDRESS SPACE AND ON A DIRECT DATA FILE BASIS

(75) Inventor: Sergey Anatolievich Gorobets, Edinburgh (GB)

(73) Assignee: Sandisk Corporation, Milpitas, CA (US)

(*) Notice: Subject to any disclaimer, the term of this patent is extended or adjusted under 35 U.S.C. 154(b) by 331 days.

(21) Appl. No.: 11/196,869

(22) Filed: Aug. 3, 2005

(65) Prior Publication Data

US 2007/0033323 A1     Feb. 8, 2007

(51) Int. Cl.
G06F 12/06     (2006.01)
G06F 13/10     (2006.01)

(52) U.S. Cl. ...................... 711/115; 711/206
(58) Field of Classification Search .......... 711/115, 711/206
See application file for complete search history.

(56) References Cited

U.S. PATENT DOCUMENTS

| | | |
|---|---|---|
| 4,800,520 A | 1/1989 | Iijima |
| 4,802,117 A | 1/1989 | Chrosny et al. |
| 5,226,155 A | 7/1993 | Iijima |
| 5,369,754 A | 11/1994 | Fandrich et al. |
| 5,388,083 A | 2/1995 | Assar et al. |
| 5,404,485 A | 4/1995 | Ban |
| 5,570,315 A | 10/1996 | Tanaka et al. |
| 5,592,662 A | 1/1997 | Sawada et al. |
| 5,592,669 A | 1/1997 | Robinson et al. |
| 5,602,987 A | 2/1997 | Harari et al. |
| 5,619,690 A | 4/1997 | Matsumani et al. |
| 5,634,050 A | 5/1997 | Krueger et al. |
| 5,774,397 A | 6/1998 | Endoh et al. |
| 5,799,168 A | 8/1998 | Ban |
| 5,809,558 A | 9/1998 | Matthews et al. |
| 5,832,493 A | 11/1998 | Marshall et al. |
| 5,867,641 A | 2/1999 | Jenett |
| 5,896,393 A | 4/1999 | Yard et al. |

(Continued)

FOREIGN PATENT DOCUMENTS

DE     10234971 A1     2/2004

(Continued)

OTHER PUBLICATIONS

Rankl, Wolfgang et al., "Smart Card Handbook, Third Edition (translated by Kenneth Cox)", John Wiley & Sons, Ltd., 2004, pp. 52-93, 233-369, and 435-490.

(Continued)

*Primary Examiner*—Hyung S Sough
*Assistant Examiner*—Shawn Eland
(74) *Attorney, Agent, or Firm*—Davis Wright Tremaine LLP

(57) ABSTRACT

A re-programmable non-volatile semiconductor memory, such as flash memory, operates to store files with logical addresses including a unique file identifier and offsets of data within the file, termed direct data file storage. Data files generated by a host may be stored directly in such a memory through a file interface. But if a traditional host/memory interface using a continuous logical address space is being used to identify multiple files, the address space is divided into contiguous logical files, and then these files are treated in the same manner as files obtained directly from a host. Both types of interfaces may be included in the same memory system.

33 Claims, 12 Drawing Sheets

U.S. PATENT DOCUMENTS

| | | | |
|---|---|---|---|
| 5,907,854 A | 5/1999 | Kerns | |
| 5,928,347 A | 7/1999 | Jones | |
| 5,933,846 A | 8/1999 | Endo | |
| 5,937,425 A | 8/1999 | Ban | |
| 5,966,720 A | 10/1999 | Itoh et al. | |
| 5,987,478 A | 11/1999 | See et al. | |
| 6,014,724 A | 1/2000 | Jenett | |
| 6,021,415 A | 2/2000 | Cannon et al. | |
| 6,038,636 A | 3/2000 | Brown, III et al. | |
| 6,046,935 A | 4/2000 | Takeuchi et al. | |
| 6,069,827 A | 5/2000 | Sinclair | |
| 6,145,069 A | 11/2000 | Dye | |
| 6,148,354 A | 11/2000 | Ban et al. | |
| 6,216,204 B1 | 4/2001 | Thiriet | |
| 6,226,728 B1 | 5/2001 | See et al. | |
| 6,256,690 B1 | 7/2001 | Carper | |
| 6,275,804 B1 | 8/2001 | Carl et al. | |
| 6,279,069 B1 | 8/2001 | Robinson et al. | |
| 6,373,746 B1 | 4/2002 | Takeuchi et al. | |
| 6,385,690 B1 | 5/2002 | Iida et al. | |
| 6,412,040 B2 | 6/2002 | Hasbun et al. | |
| 6,426,893 B1 | 7/2002 | Conley et al. | |
| 6,446,140 B1 | 9/2002 | Nozu | |
| 6,456,528 B1 | 9/2002 | Chen | |
| 6,467,015 B1 | 10/2002 | Nolan et al. | |
| 6,467,021 B1 | 10/2002 | Sinclair | |
| 6,477,616 B1 | 11/2002 | Takahashi | |
| 6,480,935 B1 | 11/2002 | Carper et al. | |
| 6,484,937 B1 | 11/2002 | Devaux et al. | |
| 6,490,649 B2 | 12/2002 | Sinclair | |
| 6,493,811 B1 | 12/2002 | Blades et al. | |
| 6,522,580 B2 | 2/2003 | Chen et al. | |
| 6,535,949 B1 | 3/2003 | Parker | |
| 6,542,407 B1 | 4/2003 | Chen et al. | |
| 6,547,150 B1 | 4/2003 | Deo et al. | |
| 6,567,307 B1 | 5/2003 | Estakhri | |
| 6,598,114 B2 | 7/2003 | Funakoshi | |
| 6,604,168 B2 | 8/2003 | Ogawa | |
| 6,668,336 B2 | 12/2003 | Lasser | |
| 6,681,239 B1 * | 1/2004 | Munroe et al. | 718/104 |
| 6,763,424 B2 | 7/2004 | Conley | |
| 6,766,432 B2 | 7/2004 | Saltz | |
| 6,771,536 B2 | 8/2004 | Li et al. | |
| 6,772,955 B2 | 8/2004 | Yoshimoto et al. | |
| 6,779,063 B2 | 8/2004 | Yamamoto | |
| 6,781,877 B2 | 8/2004 | Cernea et al. | |
| 6,823,417 B2 | 11/2004 | Spencer | |
| 6,834,331 B1 | 12/2004 | Liu | |
| 6,886,083 B2 | 4/2005 | Murakami | |
| 6,895,464 B2 | 5/2005 | Chow et al. | |
| 6,898,662 B2 | 5/2005 | Gorobets | |
| 6,915,383 B2 | 7/2005 | Morris et al. | |
| 6,925,007 B2 | 8/2005 | Harari et al. | |
| 6,938,116 B2 | 8/2005 | Kim et al. | |
| 6,965,963 B1 | 11/2005 | Nakanishi et al. | |
| 7,032,065 B2 | 4/2006 | Gonzalez et al. | |
| 7,092,911 B2 | 8/2006 | Yokota et al. | |
| 7,167,960 B2 | 1/2007 | Kodama et al. | |
| 7,275,097 B2 | 9/2007 | Peake, Jr. et al. | |
| 2002/0099904 A1 | 7/2002 | Conley | |
| 2003/0088812 A1 | 5/2003 | Lasser | |
| 2003/0109093 A1 | 6/2003 | Harari et al. | |
| 2003/0147278 A1 | 8/2003 | Tanaka et al. | |
| 2003/0229753 A1 | 12/2003 | Hwang | |
| 2003/0229769 A1 | 12/2003 | Montemayor | |
| 2004/0019716 A1 | 1/2004 | Bychkov et al. | |
| 2004/0073727 A1 | 4/2004 | Moran et al. | |
| 2004/0103241 A1 | 5/2004 | Chang et al. | |
| 2004/0157638 A1 | 8/2004 | Moran et al. | |
| 2004/0248612 A1 | 12/2004 | Lee et al. | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144358 A1 | 6/2005 | Conley et al. | |
| 2005/0144360 A1 | 6/2005 | Bennett et al. | |
| 2005/0144363 A1 | 6/2005 | Sinclair | |
| 2005/0144365 A1 | 6/2005 | Gorobets et al. | |
| 2005/0144367 A1 | 6/2005 | Sinclair | |
| 2005/0166087 A1 | 7/2005 | Gorobets | |
| 2006/0020744 A1 | 1/2006 | Sinclair et al. | |
| 2006/0020745 A1 | 1/2006 | Conley et al. | |
| 2006/0031593 A1 | 2/2006 | Sinclair | |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161724 A1 | 7/2006 | Bennett et al. | |
| 2006/0161728 A1 | 7/2006 | Bennett et al. | |
| 2006/0168395 A1 | 7/2006 | Deng et al. | |
| 2006/0184718 A1 | 8/2006 | Sinclair et al. | |
| 2006/0184719 A1 | 8/2006 | Sinclair | |
| 2006/0184720 A1 | 8/2006 | Sinclair et al. | |
| 2006/0184722 A1 | 8/2006 | Sinclair | |
| 2006/0184723 A1 | 8/2006 | Sinclair et al. | |
| 2007/0030734 A1 | 2/2007 | Sinclair et al. | |
| 2007/0033324 A1 | 2/2007 | Sinclair | |
| 2007/0033326 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033331 A1 | 2/2007 | Sinclair et al. | |
| 2007/0033332 A1 | 2/2007 | Sinclair et al. | |
| 2007/0033374 A1 | 2/2007 | Sinclair et al. | |
| 2007/0033375 A1 | 2/2007 | Sinclair et al. | |
| 2007/0033376 A1 | 2/2007 | Sinclair et al. | |
| 2007/0033377 A1 | 2/2007 | Sinclair et al. | |
| 2007/0033378 A1 | 2/2007 | Sinclair et al. | |
| 2007/0086260 A1 | 4/2007 | Sinclair | |
| 2007/0088904 A1 | 4/2007 | Sinclair | |
| 2007/0186032 A1 | 8/2007 | Sinclair et al. | |

FOREIGN PATENT DOCUMENTS

| | | |
|---|---|---|
| EP | 0 852 765 B1 | 9/2001 |
| EP | 1100001 B1 | 8/2003 |
| EP | 1 571 557 A1 | 9/2005 |
| JP | 62-283496 A | 12/1987 |
| JP | 2002-251310 A | 9/2002 |
| JP | 2005-122439 A | 5/2005 |
| WO | WO 00/49488 A1 | 8/2000 |
| WO | WO 02/29575 A2 | 4/2002 |
| WO | WO 2004/012027 A2 | 2/2004 |
| WO | WO 2004/040453 A2 | 5/2004 |
| WO | WO 2004/040455 A2 | 5/2004 |
| WO | WO 2004/046937 A1 | 6/2004 |
| WO | WO 2005/066793 A1 | 7/2005 |

OTHER PUBLICATIONS

Ban, Amir, "Inside Flash File Systems—Part I", IC Card Systems & Design, Jul./Aug. 1993, pp. 15-16, 18.

Ban, Amir, "Inside Flash File Systems—Part II", IC Card Systems & Designs, Sep./Oct. 1993, pp. 21-24.

Intel AP-686 Application Note, "Flash File System Selection Guide," Dec. 1998, 18 pages.

Ban, Amir, "Local Flash Disks: Two Architectures Compared," M-Systems Flash Disk Pioneers, White Paper, Rev. 1.0, Aug. 2001, 9 pages.

Chiang, Mei-Ling et al., "Data Management in a Flash Memory Based Storage Server", National Chiao-Tung University, Hsinchu, Taiwan, Dept. of Computer and Information Science, 8 pages.

Kim, Han-Joon et al., "A New Flash Memory Management for Flash Storage System", Computer Software and Applications Conference, 1999. Compsac '99 Proceedings. IEEE Comput. Soc., pp. 284-289.

Chiang et al., "Cleaning Policies in Mobile Computers Using Flash Memory," *Journal of Systems & Software*, vol. 48, 1999, pp. 213-231.

Imamiya et al., "A 125-mm2 1-Gb NAND Flash Memory with 10-Mbytes/s Program Speed" Nov. 2002, IEEE Journal of Solid-State Circuits, vol. 37, No. 11, pp. 1493-1501.

Kjelso et al., "Memory Management in Flash-Memory Disks with Data Compression," 1995, Springer-Verlag, pp. 399-413.

Kim et al., "A Space-Efficient Flash Translation Layer for CompactFlash Systems," *IEEE Transactions on Consumer Electronics*, vol. 48, No. 2, May 2002, pp. 366-375.

Lim et al., "An Efficient NAND Flash File System for Flash Memory Storage," *IEEE Transactions on Computer*, vol. 55, No. 7, Jul. 1, 2006, pp. 906-912.

PNY Technologies Attache Flash Product, http://web.archive.org/web/20030704092223/http://www.pny.com/products/flash/attache.asp.07/04/2003. pp. 1-2.

Wu et al., "eNVy: A Non-Volatile, Main Memory Storage System," *ACM Sigplan Notices*, vol. 29, No. 11, Nov. 1, 2994, pp. 86-97.

EPO/ISA, "Notification of Transmittal of the International Search Report and the Written Opinion of the International Searching Authority, or the Declaration," corresponding PCT/US2006/028959 on Mar. 20, 2007, 12 pages.

\* cited by examiner

Logical Files

Host Files

Data Groups & Flash Blocks

Logical Files

Host Files

Data Groups & Flash Blocks

INTERFACING SYSTEMS OPERATING THROUGH A LOGICAL ADDRESS SPACE AND ON A DIRECT DATA FILE BASIS

GENERAL BACKGROUND

This application relates generally to data communication between electronic systems having different interfaces, and, more specifically, to the operation of memory systems, such as re-programmable non-volatile semiconductor flash memory in the form of removable memory cards or otherwise, by the management of the interface between the memory system and a host device to which the memory is connected or connectable.

There are two primary techniques by which data communicated through external interfaces of host systems, memory systems and other electronic systems are addressed. In one of them, addresses of data files generated or received by the system are mapped into distinct ranges of a continuous logical address space established for the system. The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive. In the second of the two techniques, data files generated or received by an electronic system are uniquely identified and their data logically addressed by offsets within the file. A form of this addressing method is used between computers or other host systems and a removable memory card known as a "Smart Card." Smart Cards are typically used by consumers for identification, banking, point-of-sale purchases, ATM access and the like.

These two different addressing techniques are not compatible. That is, a system using one of them cannot communicate data with a system using the other. A purpose of the present invention is to bridge this gap and allow communication of data between logical address space and file based systems. The descriptions below provide examples of data communication between host and memory systems where the host system utilizes a logical address space interface and the memory system has a file based interface. The example memory system that is described is re-programmable non-volatile semiconductor flash memory.

In an early generation of commercial flash memory systems, a rectangular array of memory cells was divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In later generations of flash memory systems, the size of the erase unit was increased to a block of enough memory cells to store multiple sectors of data. Even though host systems with which the memory systems are connected may program and read data in small minimum units such as sectors, a large number of sectors are stored in a single erase unit of the flash memory. It is common for some sectors of data within a block to become obsolete as the host updates or replaces logical sectors of data. Since the entire block must be erased before any data stored in the block can be overwritten, new or updated data are typically stored in another block that has been erased and has remaining capacity for the data. This process leaves the original block with obsolete data that take valuable space within the memory. But that block cannot be erased if there are any valid data remaining in it.

Therefore, in order to better utilize the memory's storage capacity, it is common to consolidate or collect valid partial block amounts of data by copying them into an erased block so that the block(s) from which these data are copied may then be erased and their entire storage capacity reused. It is also desirable to copy the data in order to group data sectors within a block in the order of their logical addresses since this increases the speed of reading the data and transferring the read data to the host. If such data copying occurs too frequently, the operating performance of the memory system can be degraded. This particularly affects operation of memory systems where the storage capacity of the memory is little more than the amount of data addressable by the host through the logical address space of the system, a typical case. In this case, data consolidation or collection may be required before a host programming command can be executed. The programming time is then increased.

The sizes of the blocks are increasing in successive generations of memory systems in order to increase the number of bits of data that may be stored in a given semiconductor area. Blocks storing 256 data sectors and more are becoming common. Additionally, two, four or more blocks of different arrays or sub-arrays are often logically linked together into metablocks in order to increase the degree of parallelism in data programming and reading. Along with such large capacity operating units come challenges in operating them efficiently.

A common host interface for such memory systems is a logical address interface similar to that commonly used with disk drives. Files generated by a host to which the memory is connected are assigned unique addresses within the logical address space of the interface. The memory system then commonly maps data between the logical address space and the physical blocks or metablocks of the memory. The memory system keeps track of how the logical address space is mapped into the physical memory but the host is unaware of this. The host keeps track of the addresses of its data files within the logical address space but the memory system operates without knowledge of this mapping.

SUMMARY OF THE INVENTION

Data are communicated between a logical address space interface of a first system and a direct data file interface of a second system by dividing the logical address space of the first system into distinct contiguous groups of addresses and then treating data within the individual groups as separate files of the second system. The amount of data in each of the groups is preferably made to be the same, and can be selected to be an amount that the second system efficiently utilizes. The first and second systems may be any of a wide variety of electronic systems that externally send and/or receive digital data through such interfaces. In examples described in detail hereinafter, the first system is a host, such as a personal computer, camera or audio player, and the second system is a memory. The memory may be in the form of a card that is removably connected to the host. Although the memory can be any one of a wide variety of types, semiconductor flash memory is described hereinafter.

For efficient operation, the memory system described herein directly stores data in the form of individual files. Each data file is stored with a unique identification, such as simply a number, and its data is represented by offset addresses within the file. But if the traditional interface exists between the host and the memory system, its logical address space needs to somehow be mapped into the data file based storage system. This is accomplished herein by representing the logical address space as a number of logical files, data in one range of addresses forming one logical file, data of an adjacent but non-overlapping range of addresses becomes another file, and so forth. Each logical file is represented by a unique file identifier and offsets of data within the file, so can be directly stored within the direct data file memory system. Each logical file most conveniently includes the same amount of data, and this amount is preferably equal to the data storage capacity of a physical unit of the memory system.

Since the memory system directly stores data files, it can also interface with a host to more efficiently exchange host files directly in those cases where the host is configured to operate with a direct data file interface. When the direct data file interface of a dual interface memory is used, the logical address interface is not used. By including both the logical address and direct file interfaces in the memory system, however, the memory may be used in the most efficient manner with host systems that support a direct data file interface but at the same time is backward compatible with hosts that only operate with the traditional logical address interface. But as described in the immediately preceding paragraph, a memory system may be provided only the logical address space interface within the direct data file interface, in which case the direct data file interface is completely internal to the memory system.

Other aspects, advantages, features and details of the present invention are included in a description of exemplary examples thereof that follows, which description should be taken in conjunction with the accompanying drawings. Further, all patents, patent applications, articles and other publications, documents and things referenced herein are hereby incorporated herein by this reference in their entirety for all purposes.

BRIEF DESCRIPTION OF THE DRAWINGS

FIG. 8 illustrates in a different manner than FIG. 7 a logical address space interface between a host and a re-programmable memory system;

FLASH MEMORY SYSTEM GENERAL DESCRIPTION

A common flash memory system is first described with respect to FIGS. 1-6. It is in such a system that the various aspects of the present invention may be implemented. A host system 1 of FIG. 1 stores data into and retrieves data from a flash memory 2. Although the flash memory can be embedded within the host, the memory 2 is illustrated to be in the more popular form of a card that is removably connected to the host through mating parts 3 and 4 of a mechanical and electrical connector. There are currently many different flash memory cards that are commercially available, examples being the CompactFlash (CF), the MultiMediaCard (MMC), Secure Digital (SD), miniSd, Memory Stick, SmartMedia and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory only systems that are instead controlled by software executed by the host to which the memory is connected. In some memory systems containing the controller, especially those embedded within a host, the memory, controller and drivers are often formed on a single integrated circuit chip.

Figure 1:
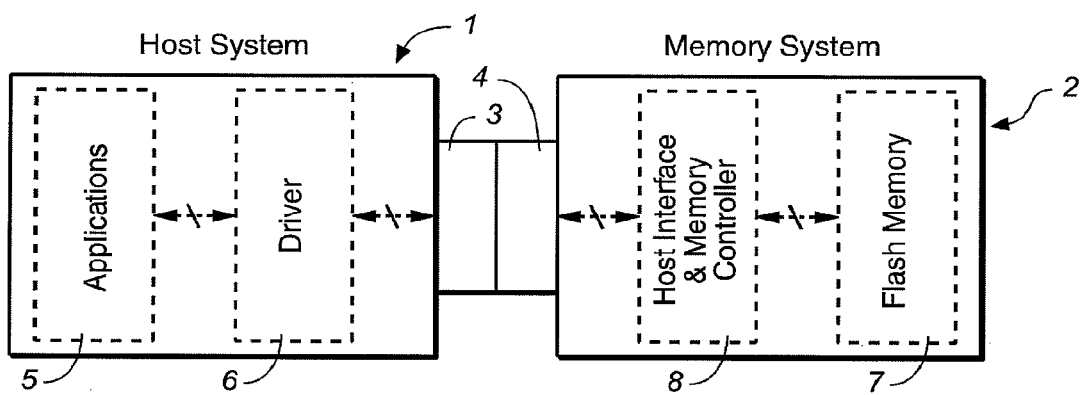
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
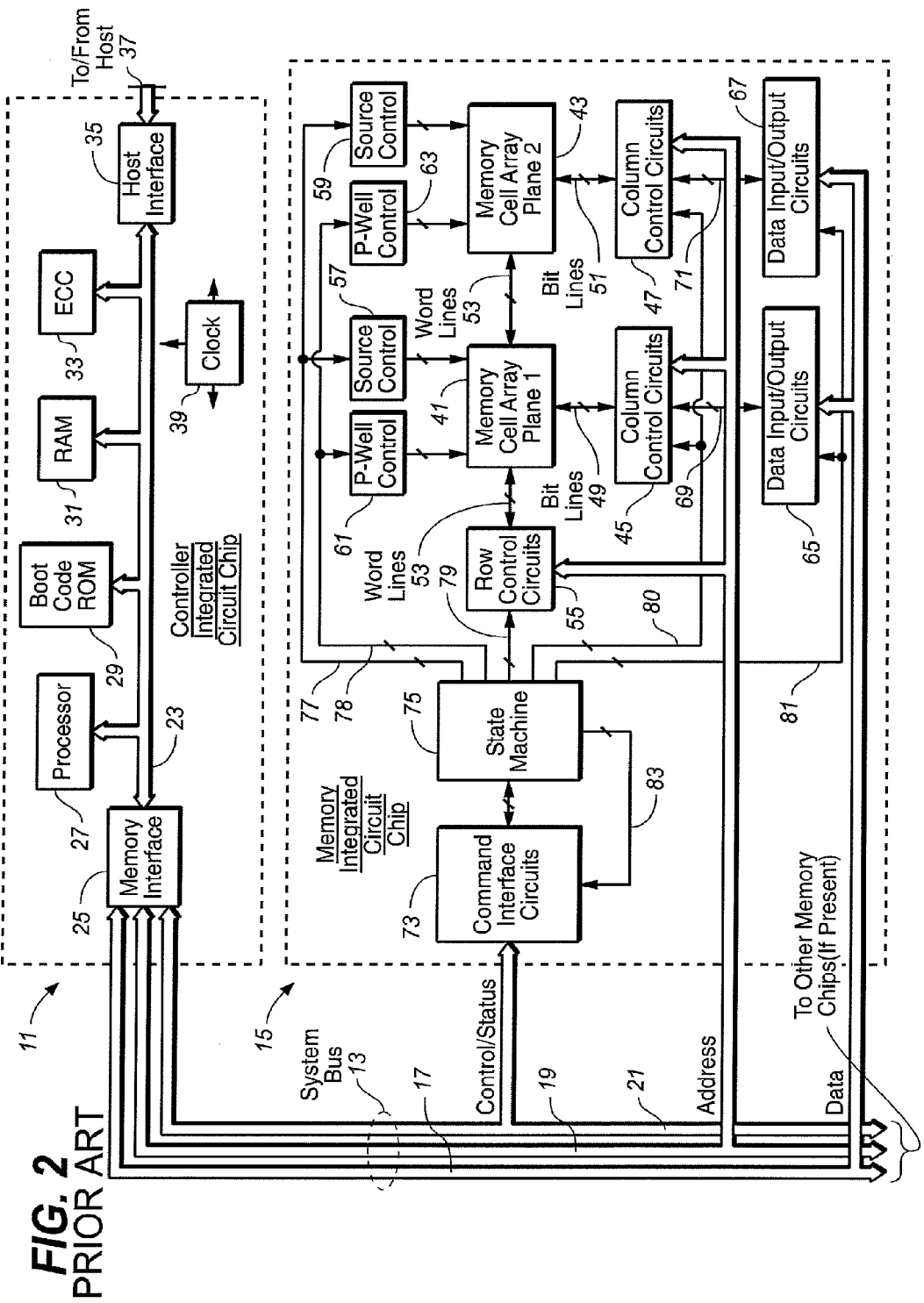
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and It's Use in Flash Memory Systems."

A typical controller chip. 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
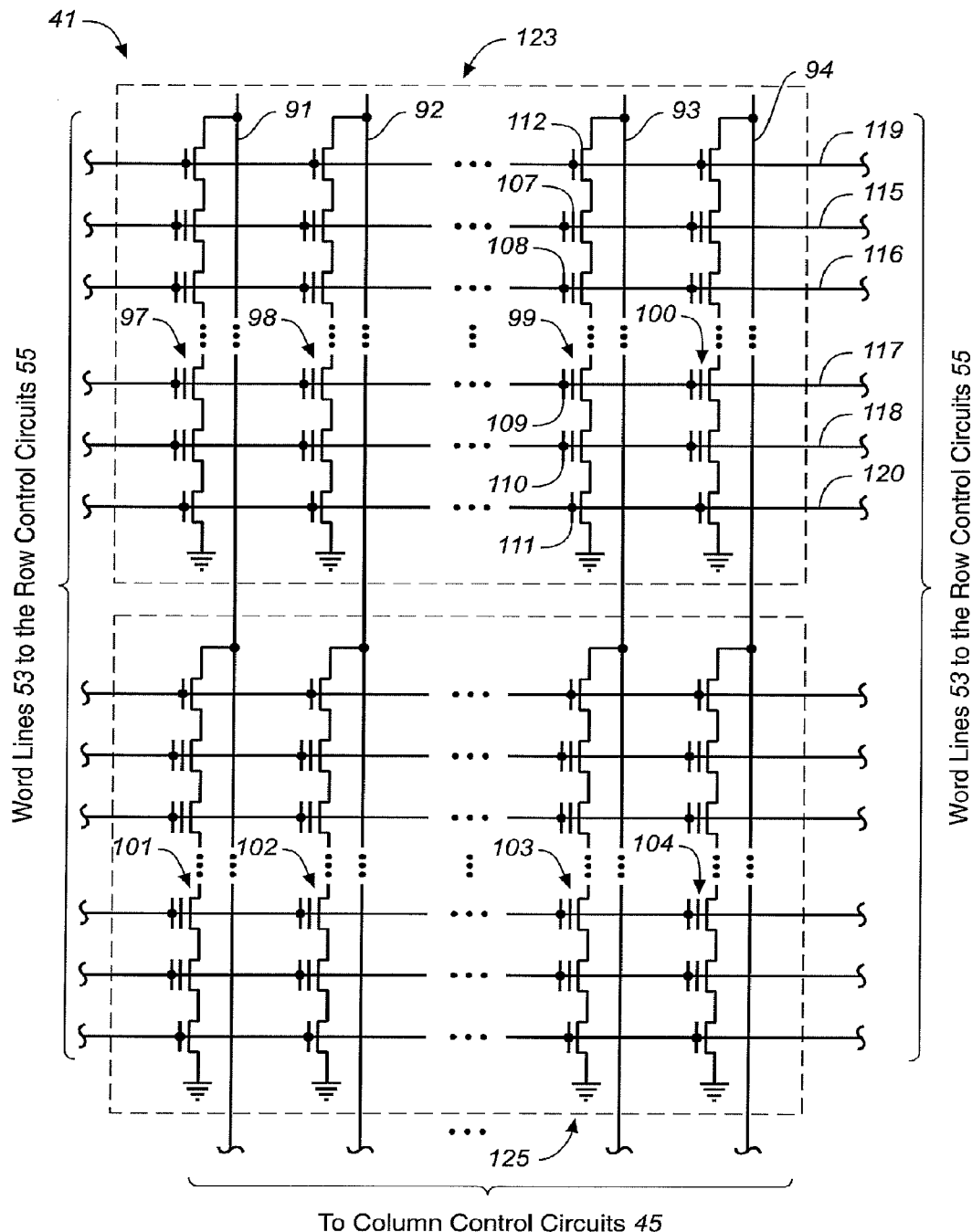
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in United States patent application publication no. 2003/0109093.

Figure 4:
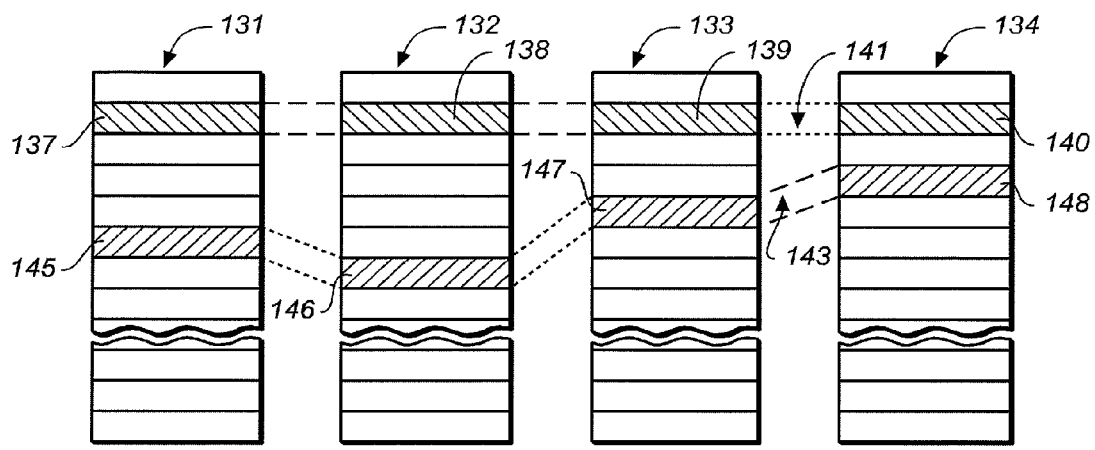
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane. As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
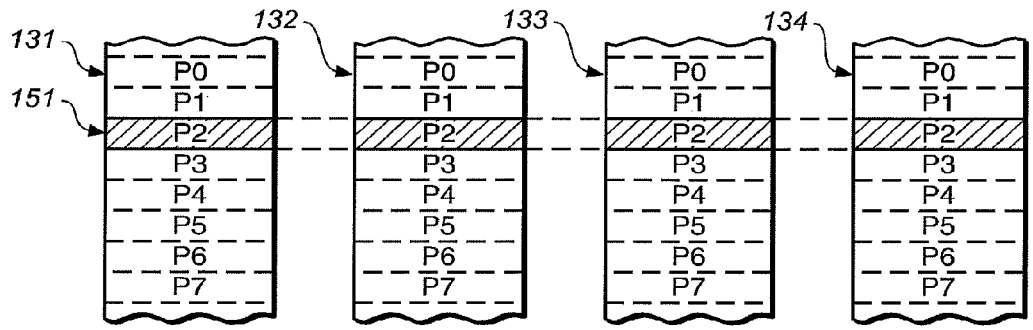
FIG. 5 shows an expanded view of a portion of the physical memory of FIG. 4.

The individual blocks are in turn divided for operational purposes into pages of memory cells, as illustrated in FIG. 5. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 131-134. The metapage 151, for example, includes the page P2 in of each of the four blocks but the pages of a metapage need not necessarily have the same relative position within each of the blocks. A metapage is the maximum unit of programming.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
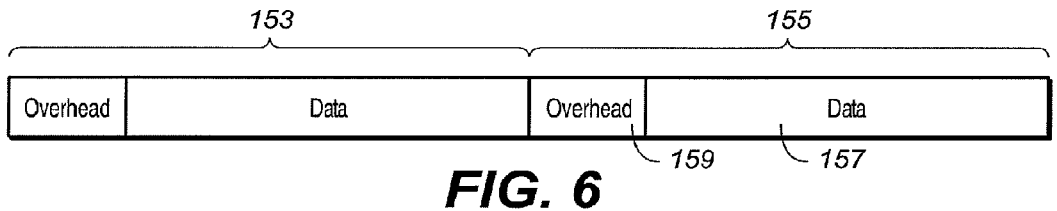
FIG. 6 shows a further expanded view of a portion of the physical memory of FIGS. 4 and 5.

The amount of data in each logical page is typically an integer number of one or more sectors of data, each sector containing 512 bytes of data, by convention. The sector is the minimum unit of data transferred to and from the memory system. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks. In either case, a sector denotes a unit of stored data with which an ECC is associated.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows are increased. For this reason, the width of flash memories is being extended in order to increase the amount of data in a page and a metapage.

Host-Memory Interface and General Memory Operation

The physically small re-programmable non-volatile memory cards and flash drives identified above are commercially available with data storage capacity of 512 megabytes (MB), 1 gigabyte (GB), 2 GB and 4 GB, and may go higher. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Figure 7:
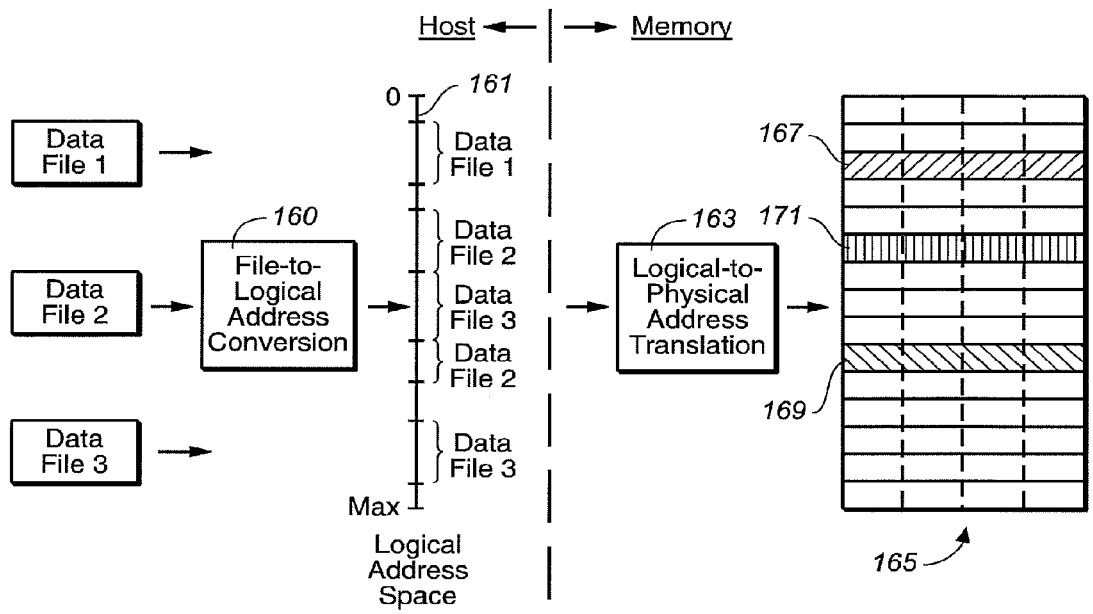
FIG. 7 illustrates a logical address space interface between a host and a re-programmable memory system.

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to Data File 1, by a file-to-logical address conversion 160. Data File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a Data File 2 is later created by the host, the host similarly assigns two different ranges of contiguous addresses within the logical address space 161, by the file-to-logical address conversion 160 of FIG. 7. A file need not be assigned contiguous logical addresses but rather can be fragments of addresses in between address ranges already allocated to other files. This example then shows that yet another Data File 3 created by the host is allocated other portions of the host address space not previously allocated to the Data Files 1 and 2 and other data.

The host keeps track of the memory logical address space by maintaining a file allocation table (FAT), where the logical addresses assigned by the host to the various host files by the conversion 160 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through the typical host/card interface being described, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. Most of the remaining metablocks shown in FIG. 7 are used to store host data. When the host writes data to the memory system, the function 163 of the controller converts the logical addresses assigned by the host to physical addresses within a metablock in the erased block pool. Other metablocks not being used to store data within the logical address space 161 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory, so data consolidation or garbage collection is needed first to clear one or more metablocks of valid data, which can then be erased. Attention has therefore been directed to managing control of the memory in order to minimize such disruptions. Many such techniques are described in the following United States patent applications, referenced hereinafter as the "LBA Patent Applications": Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; and Ser. No. 10/917,725, filed Aug. 13, 2004, entitled "Non-Volatile Memory and Method with Control Data Management," Ser. No.11/192,220, filed Jul. 27, 2005, entitled "Non-Volatile Memory and Method with Multi-Stream Update Tracking," Ser. No. 11/192,386, filed Jul. 27, 2005, entitled "Non-Volatile Memory and Method with Improved Indexing for Scratch Pad and Update Blocks," and Ser. No. 11/191,686, filed Jul. 27, 2005, entitled "Non-Volatile Memory and Method with Multi-Stream Updating".

One challenge to efficiently control operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks." The fitting of boundaries between blocks of data and physical boundaries between metablocks is described in patent applications Ser. No. 10/841,118, filed May 7, 2004, and Ser. No. 11/016,271, filed Dec. 16, 2004, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 161 (FIG. 7), as described above.

Referring to FIG. 8, the typical logical address host/memory interface as already shown in FIG. 7 is illustrated differently. The host generated data files are allocated logical addresses by the host. The memory system then sees these logical addresses and maps them into physical addresses of blocks of memory cells where the data are actually stored.

A different type of interface between the host and memory system, termed a direct data file interface, does not use the logical address space. The host instead logically addresses each file by a unique number, or other identifying reference, and offset addresses of units of data (such as bytes) within the file. This file address is given directly by the host to the memory system controller, which then keeps its own table of where the data of each host file are physically stored. This new interface can be implemented with the same memory system as described above with respect to FIGS. 2-6. The primary difference with what is described above is the manner in which that memory system communicates with a host system.

Figure 9:
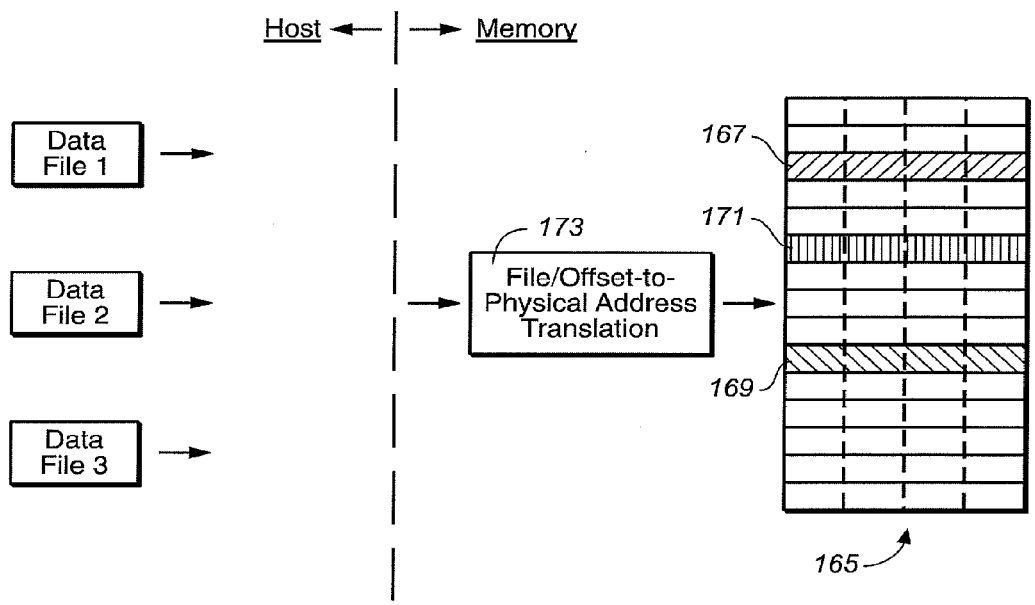
FIG. 9 illustrates a direct data file storage interface between a host and a re-programmable memory system.

Such a direct data file interface is illustrated in FIG. 9, which may be compared with the logical address interface of FIG. 7. An identification of each of the Files 1, 2 and 3 and offsets of data within the files of FIG. 9 are passed directly to the memory controller. This logical address information is then translated by a memory controller function 173 into physical addresses of metablocks and metapages of the memory 165. A file directory keeps track of the host file to which each stored sector or other unit of data belongs.

Figure 10:
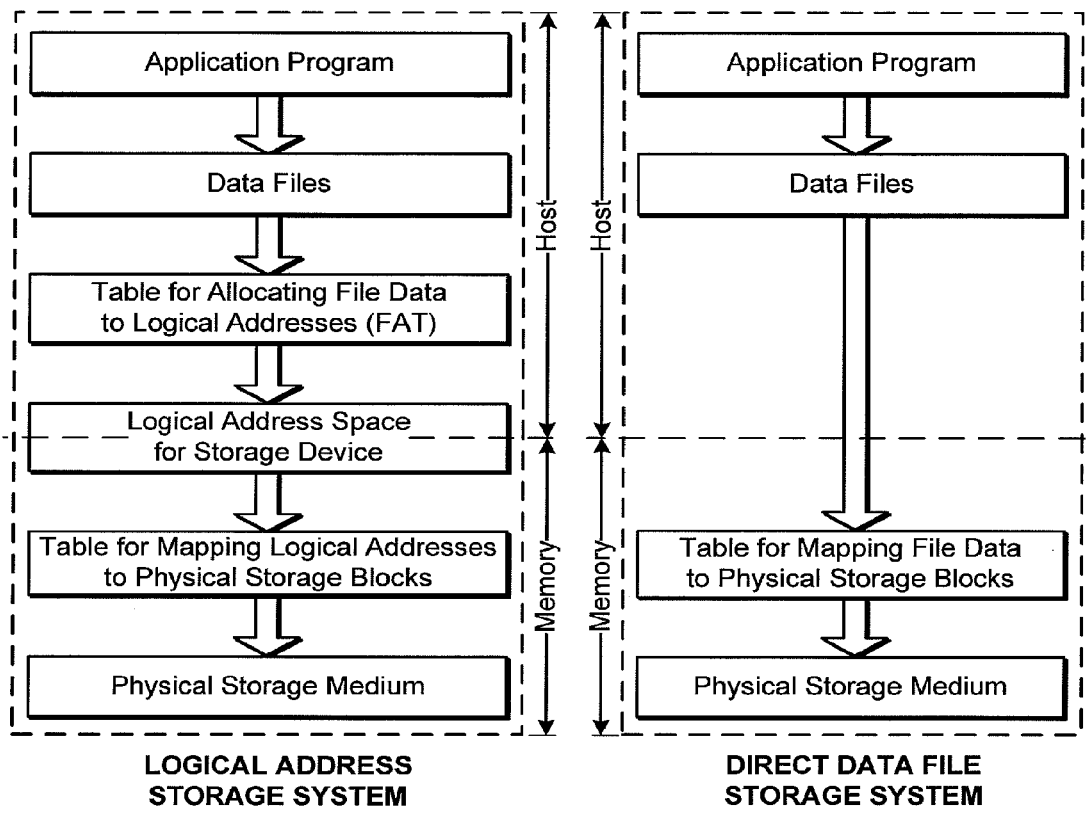
FIG. 10 illustrates, in a different manner than FIG. 9, a direct data file storage interface between a host and a re-programmable memory system.

The direct data file interface is also illustrated by FIG. 10, which should be compared with the logical address interface of FIG. 8. The logical address space and host maintained FAT table of FIG. 8 are not present in FIG. 10. Rather, data files generated by the host are identified to the memory system by file number and offsets of data within the file. The memory system controller then directly maps the files to the physical blocks of the memory cell array and maintains directory and index table information of the memory blocks into which host files are stored. It is then unnecessary for the host to maintain the file allocation table (FAT) that is currently necessary for managing a logical address interface.

Since the memory system knows the locations of data making up each file, these data may be erased soon after a host deletes the file. This is not possible with a typical logical address interface. Further, by identifying host data by file objects instead of using logical addresses, the memory system controller can store the data in a manner that reduces the need for frequent data consolidation and collection. The frequency of data copy operations and the amount of data copied are thus significantly reduced, thereby increasing the data programming and reading performance of the memory system.

Direct data file storage memory systems are described in pending U.S. patent applications, Ser. No. 11/060,174, 11/060,248 and 11/060,249, all filed on Feb. 16, 2005 naming either Alan W. Sinclair alone or with Peter J. Smith, and a provisional application Ser. No. 60/705,388,filed by Alan W. Sinclair and Barry Wright on Aug. 3, 2005, and entitled "Direct Data File Storage in Flash Memories" (hereinafter collectively referenced as the "Direct Data File Storage Applications").

Since the direct data file interface of these Direct Data File Storage Applications, as illustrated by FIGS. 9 and 10, is simpler than the logical address space interface described above, as illustrated by FIGS. 7 and 8, and allows the memory system to perform better, the direct data file storage is preferred for many applications. But host systems are primarily configured at the present time to operate with the logical address space interface, so a memory system with a direct data file interface is not compatible with most hosts. It is therefore desirable to provide the memory system with the ability to operate with either interface.

One way to do this is to have, in effect, two memory systems in one package, one system to directly store host data files and the other to store data through a logical address space. But the complexity of such a combined system would be very high, and therefore also its cost, while its flexibility of use would be very poor.

Therefore, it is desirable to be able to operate a single "backend" memory system through both direct data file and logical address "front-end" interfaces. Conceptually, this can be accomplished by adding a direct data file interface to an existing memory system that operates with a logical address interface. But such a system would likely be very cumbersome to operate in the direct data file mode.

It has therefore been found preferable to utilize a backend memory system operating with a direct data file interface, with the added ability to also interface with the conventional logical address space. This takes advantage of the superior operation of a file based memory system of the type described in the Direct Data File Storage Applications. But it is not an insubstantial matter to make a direct data file memory backend operate efficiently with a logical address space interface at the front end.

Direct Data File Storage through a Logical Address Interface

A key feature of the improvements being described herein is a division of the logical address space of the host/memory interface into groups of logical addresses, and then the treatment of the data in each group as a separate logical file that is stored directly in the file-based memory. These logical files are handled by the memory system in the same way as data files received directly from a host. The files of both are uniquely identified and offset addresses of their data within the files are maintained. This allows the direct data file memory system to operate with a host that communicates with memory on the basis of a logical address interface. The logical files are preferably formed to contain the same amount of data, and that amount is preferably equal to the memory storage capacity of one block or metablock, depending upon the physical configuration of the memory.

This preferred size of each logical file is also the same as a logical group that is mapped into a physical block or metablock of the flash memory systems described in the LBA Patent Applications identified above. That is, a logical group of the LBA memory system and the preferred logical file herein, extends over a fixed range of contiguous addresses in the logical address space of the memory interface and contains the same amount of data as the storage capacity of a physical block or metablock of the memory, for a one-to-one correspondence. This makes it easier to manage the memory system.

Figure 11:
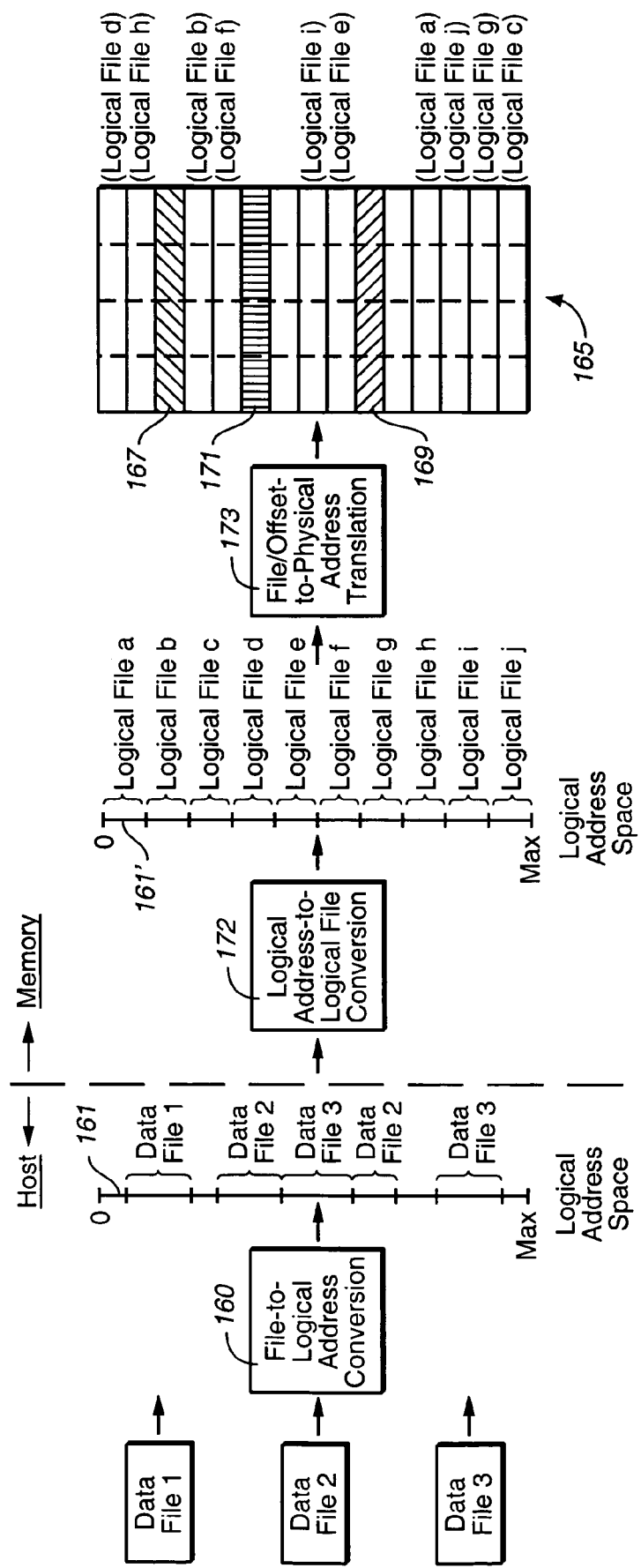
FIG. 11 illustrates a re-programmable memory system that directly stores data files but which has a logical address space interface with a host.

FIG. 11 illustrates this process. This example combines the host operation of FIG. 7 with the file based memory operation of FIG. 9 plus an added address conversion 172 within the memory system. The address conversion 172 maps groups of logical addresses across the memory space 161 into individual logical files a-j shown across the modified address space 161'. The entire logical address space 161 is preferably divided into these logical files, so the number of logical files depends upon the size of the logical address space and of the individual logical files. Each of the logical files contains data of a group of contiguous logical addresses across the space 161. The amount of data within each of the logical files is preferably made to be the same, and that amount equal to the data storage capacity of one metablock in the memory 165. Unequal sizes of the logical files and/or sizes different from the storage capacity of a block or metablock of the memory are certainly possible but not preferred.

Data within each of the individual files a-j are represented by logical offset addresses within the files. The file identifier and data offsets of the logical files are converted at 173 into physical addresses within the memory 165. The logical files a-j are stored directly in the memory 165 by the same processes and protocols described in the Direct Data File Storage Applications. The process is the same as that used to store data files 1-3 of FIG. 9 in the memory 165, except that the known amount of data in each logical file can make this easier, especially if that amount is equal to the capacity of a block or metablock of the memory. It is shown in FIG. 11 that each of the logical files a-j is mapped to a different one of the metablocks of the memory 165. It is also desirable that the file based data storage interact with the host in the same or an equivalent manner as present logical address memory systems with which the host has been designed to interface. By mapping individual logical files into corresponding individual memory metablocks, essentially the same performance and timing characteristics are achieved with the direct data file interface memory system as when a logical address space interface is used.

Figure 12:
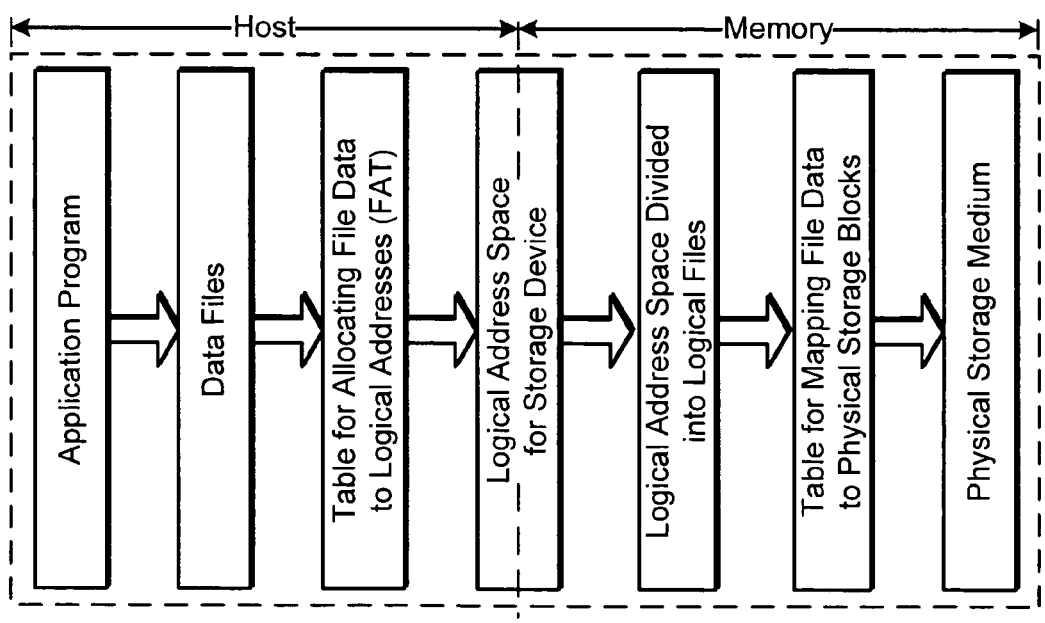
FIG. 12 illustrates, in a different manner than FIG. 11, a re-programmable memory system that directly stores data files but which has a logical address space interface with a host.

FIG. 12 illustrates the method of FIG. 11 in a different way. FIG. 12 is the same as the logical address memory system operation of FIG. 8 but with the added function of dividing the logical address space into logical files, the step 172 of FIG. 11 just described. Additionally, the "Table for Mapping File Data to Physical Storage Blocks" of FIG. 12 replaces the "Table for Mapping Logical Addresses to Physical Storage Blocks" of FIG. 8.

Figure 13:
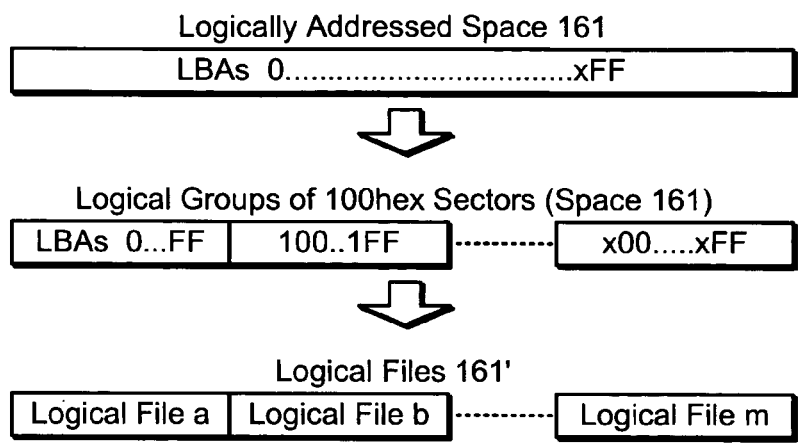
FIG. 13 shows in more detail the logical address-to-logical file conversion step of FIGS. 11 and 12.

The method of mapping the logical address (LBA) space 161 (FIG. 11) into the logical files a-j is illustrated by FIG. 13, the last logical file generically identified as logical file m. The concept of using a file storage system as a universal back-end system is based on the method of mapping LBA space to the common file storage space. The entire LBA space is split to same, preferably equal to a metablock, size logical groups and every logical group is stored as a standalone "logical" file, as illustrated in FIG. 13.

Every LBA access, which has the following format:
READ/WRITE StartLBA, Length(sectors) is converted by the logical address-to-file converter 172 (FIG. 11) to access one or more logical files in the following format:
READ/WRITE FileName, StartOffset (bytes), Length (bytes)

For example, a command
READ 101, 2 would be translated by 172 to access of the logical file b, which maps LBAs from 0x100 to 0x1FF:
READ LogFile b, 512, 1024.

The logical files can also be erased. The first write to an erased logical file would trigger padding of the head or all sectors by blank data pattern, which is typically either 0s or FFs.

Combined Logical Address and File Based Interface

Figure 14:
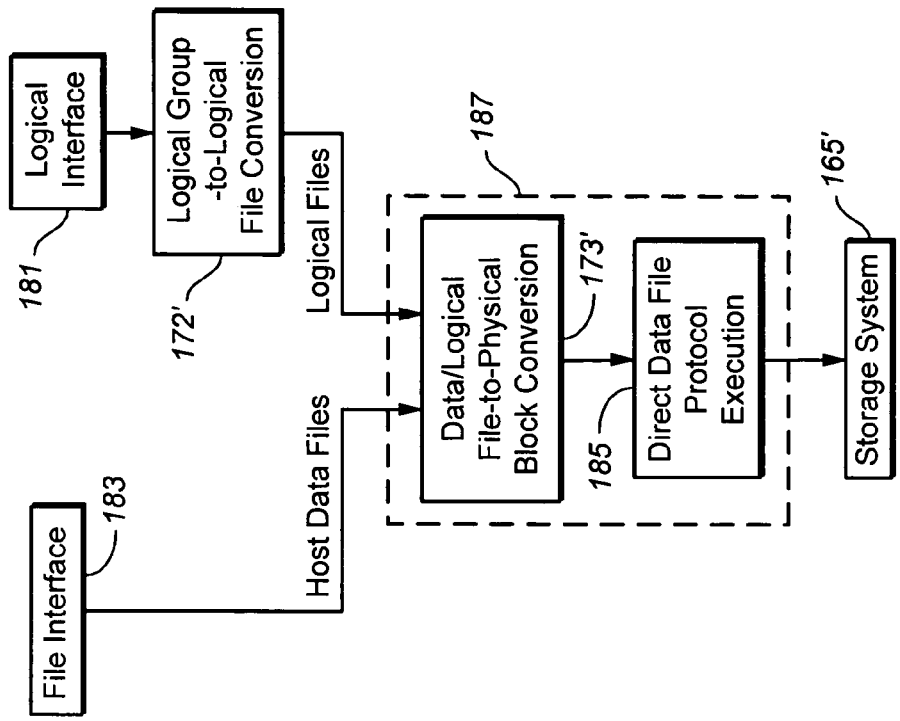
FIG. 14 illustrates a re-programmable memory system operating in a direct data file storage mode but which can interface with a host through either a logical address space interface or a direct data file interface.

The data file based backend storage system of FIGS. 11-13, designed to work through a traditional logical address space interface 181 with a host, can also have a direct data file interface 183 added, as shown generally by FIG. 14. Both host data files from the file interface 183 and logical files converted by 172' from the logical interface 181 are translated by 173' into memory metablock addresses. The data are then stored in those addresses of the memory 165' by executing a direct data file protocol, indicated at 185. This protocol includes the direct data file storage techniques of the Direct Data File Storage Applications previously listed. The processes 173' and 185 provide a file based memory interface 165'. Indeed, the path from the host file interface 183 and through the memory file interface 187 to the memory 165' preferably operates substantially as described in the Direct Data File Storage Applications.

By providing a portable memory card or flash drive, or other form of removable memory system, with both types of host interface, the memory may be used with a most current hosts that operate with a logical address space interface, with a host that directly interfaces its files to the memory, or may be exchanged between both types of hosts. This allows a user of a host with the newer file based interface to use the memory in its most efficient manner but at the same time having a backward compatibility to the traditional logical address space interface. Also, essentially the same performance and timing characteristics are achieved as a result of the same one-to-one logical file to metablock mapping. A memory with dual host interfaces allows it to be acquired by a user for its newer direct data file interface while still being useful with the extensive installed base of hosts having the traditional logical address space interface. It provides a way to migrate from the current interface to the direct data file interface.

Figure 15:
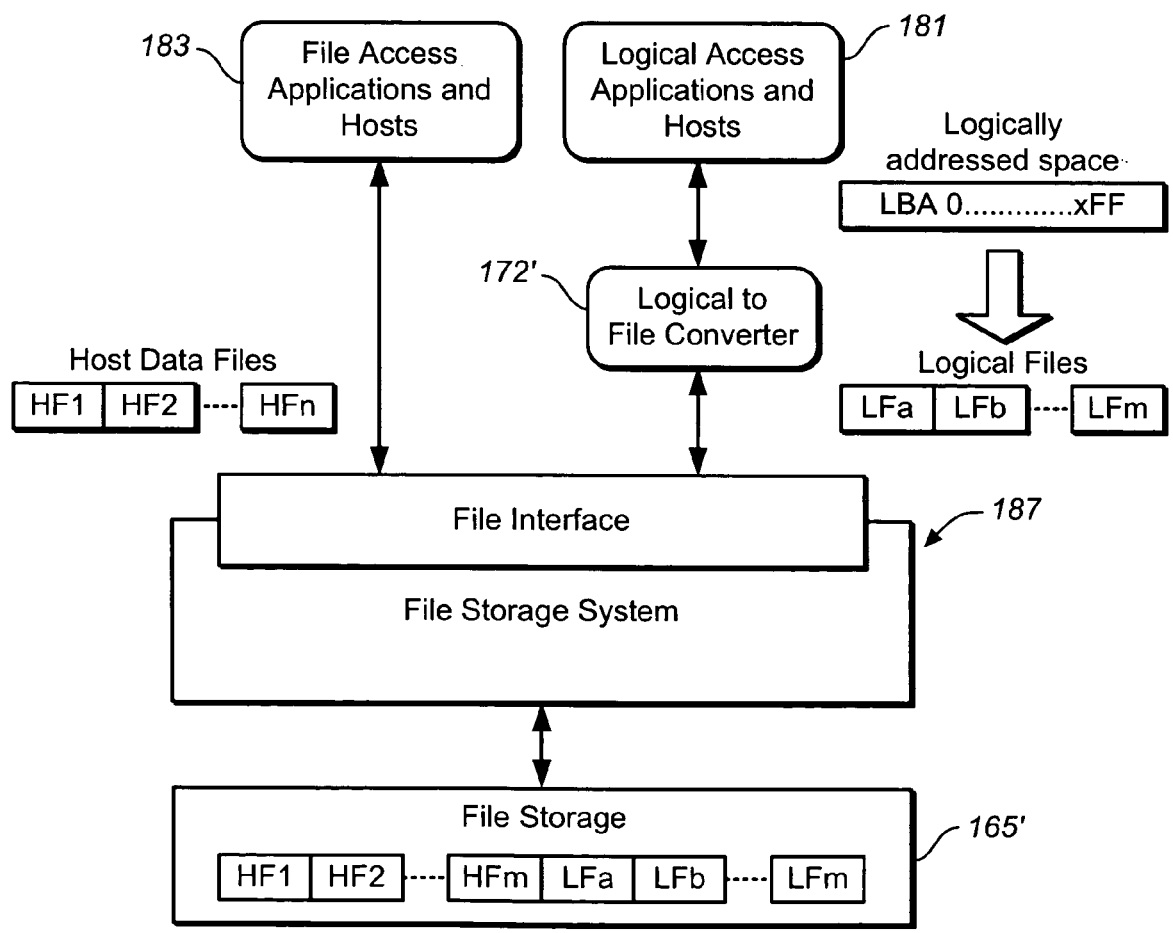
FIG. 15 illustrates, in a different manner than FIG. 14, a re-programmable memory system operating in a direct data file storage mode but which can interface with a host through either a logical address space interface or a direct data file interface.

FIG. 15 illustrates the dual host interface memory system of FIG. 14 with some additional detail. The memory 165' stores both host data files (HF1, HF2 . . . HFn) supplied directly by the host through the interface 183 and logical files (LFa, LFb . . . LFm) converted by the process 172' from the logical address space interface 181. The memory 165' does not need to distinguish logical files from host files but rather is preferably optimized to handle files of both types with a metablock size. As such, the logical files are equivalent to the logical groups of the systems described in the LBA Patent Applications, and the performance of the system, as viewed from the host interface, therefore matches that of a system with a logical address space interface as described in the LBA Patent Applications.

Updates to a logical file already stored in the memory 165' may be stored in updated blocks separate from the block in which the logical file was originally stored, similar to update systems described in the LBA Patent Applications, which support sequential and chaotic updates. The update blocks can be dedicated to a specific logical file, or shared with other logical files, or also shared with host files.

Garbage collection of a logical file can be triggered by a request to open a new update block (for either logical or host file update), or upon an update block becoming full, or by closure of the logical file by the logical-to-file converter 172'. The converter 172' can either "open" and then "close" a logical file every time it is accessed, or can optimize handling by the file storage system 187 of logical files by managing logical file closures, which may trigger garbage collection operations prematurely.

Figure 16:
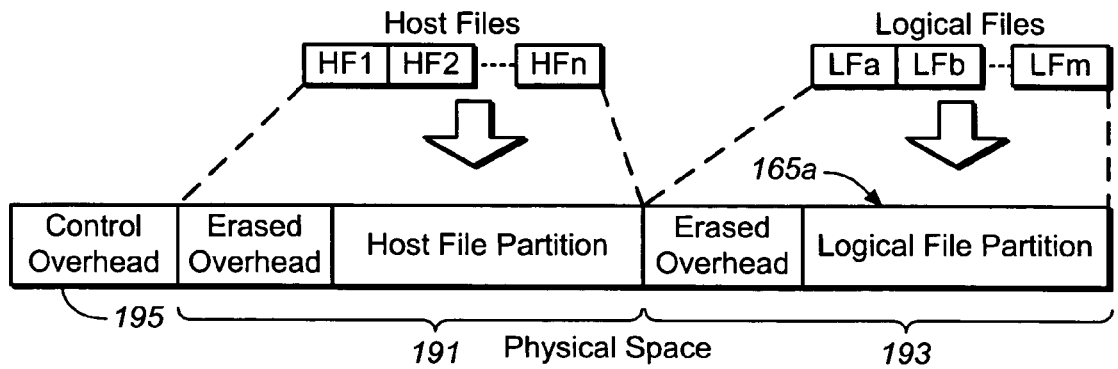
FIG. 16 shows a first embodiment for storing both host data files and logical files in the common memory of FIGS. 14 and 15, utilizing a first form of static partitioning of the physical memory space.
Figure 17:
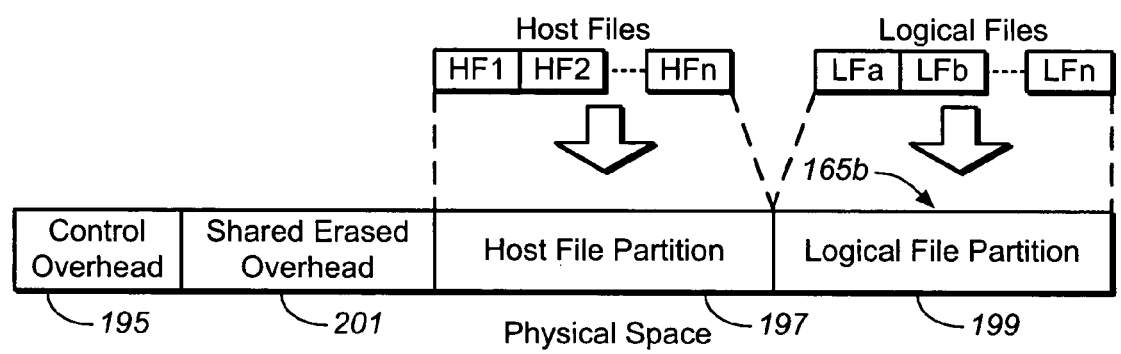
FIG. 17 shows a second embodiment for storing both host data files and logical files in the common memory of FIGS. 14 and 15, utilizing a second form of static partitioning of the physical memory space.
Figure 18:
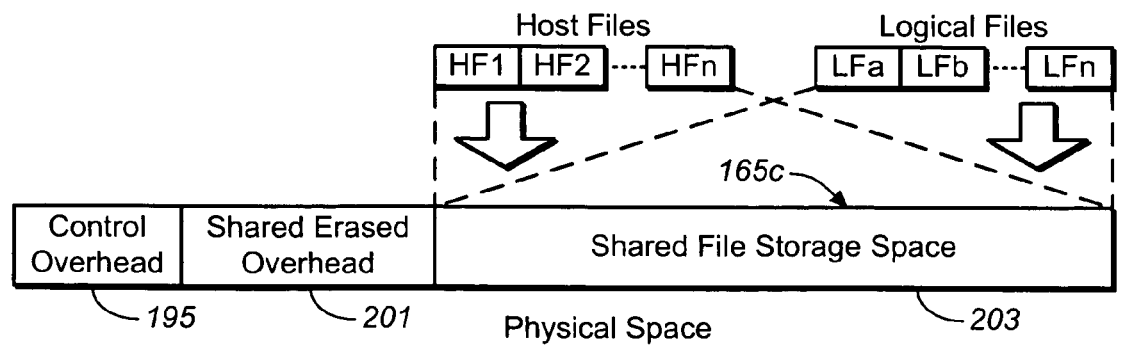
FIG. 18 shows a third embodiment for storing both host data files and logical files in the common memory of FIGS. 14 and 15, which shares common physical memory space.

The memory storage space can be shared by host files and logical files in different ways. FIGS. 16 and 17 show the host and logical files to be stored in different partitions of the physical memory, while FIG. 18 shows the two types of files sharing storage space of the memory. The arrangements described with respect to FIGS. 16-18, although not shown, can also be used to provide separate memory spaces for each of multiple files and/or logical partitions. For example, the logical address space can be partitioned into different logical drives, each logical drive then being mapped into a unique portion of the memory. Also, different physical memory cell areas can be designated for storage of data with different characteristics such as different access modes or rights, or type of encryption.

In FIG. 16, partitioning between metablocks 191 that may store host files and metablocks 193 that may store logical files is fixed and can be change by reformatting the memory card. Each of these partitions includes erased overhead metablocks as a supply of erase pool blocks to provide a new update metablock, to receive data updating a file already stored in the memory, and a new file. Update metablocks are therefore dedicated to one of the host or logical file partitions 191 and 193 and not shared between them. This allows features like secure access and data encryption to be supported more effectively. The logical address space at the host interface is preferable less than the maximum storage capacity of the memory system. One or more metablocks 195 contain operating data for the memory and are shared for use with both host and logical files.

Rather than each of the host file and logical file partitions having their own erased overhead, they may share a pool of erased metablocks. This is shown in FIG. 17. A partition 197 of metablocks for storing host files and a partition 199 for storing logical files share erased overhead metablocks 201.

There are different ways that these common metablocks may be shared. One is for metablocks of the erased block pool 201 to be shared to store either host or logical files but not data of both. This makes it more flexible to open a maximum possible number of update blocks for the currently active application, whether with host files or logical files. Available update blocks are redistributed between host file and logical file storage, as necessary. For example, host access through the logical address space interface may trigger closure of update blocks being used with host files so that more update blocks can be used for handling logical files. Alternatively, update blocks may be used to store data of both types of files.

As illustrated in FIG. 18, host files and logical files may be stored in a common group 203 of metablocks. In this method, the entire physical storage space is fully shared between host files and logical files. The memory is formatted to have a maximum storage capacity at least as large as the logical address space at the host interface. Potentially, the access and management rights of both types of files can be provided to applications of different types so that, for example, a file access program could erase a logical file, or reformat the entire card. The control data structures (control overhead 195) and update block space (erased overhead 201) are shared for both file types. The only limitation is availability of memory space at the moment.

Existing, non-erased, logical files claim a metablock worth of storage space available for host file storage. In return, the written host files make some logical files inaccessible; e.g. those logical files can be marked as bad, or reserved as a file in the FAT table.

The host generally benefits when the logical address space is defragmented. With reference to FIG. 1, for example, it can be seen that data of the fragmented host file 2 are stored in several of the logical files within the address space 161'. By defragmenting the host file 2, one or more of the logical files could be freed up for use to store other data. The host may utilized software that logically defragments some or all of its files by rewriting the data of its valid files into a single host file occupying a range of contiguous addresses. This single file may be compressed.

Figure 19:
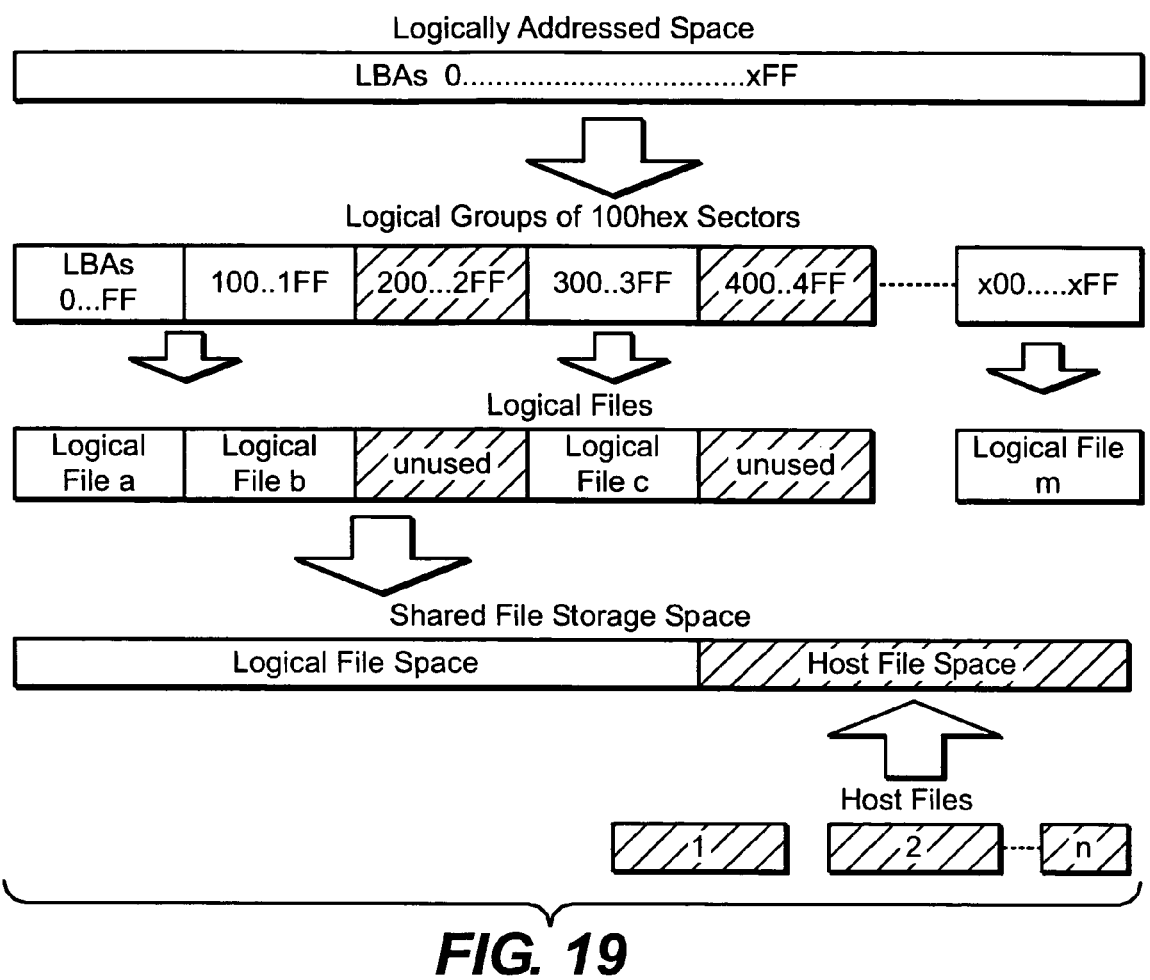
FIG. 19 provides a specific example of the third embodiment of FIG. 18.

FIG. 19 illustrates an example of the shared file storage of FIG. 18.

Figure 20:
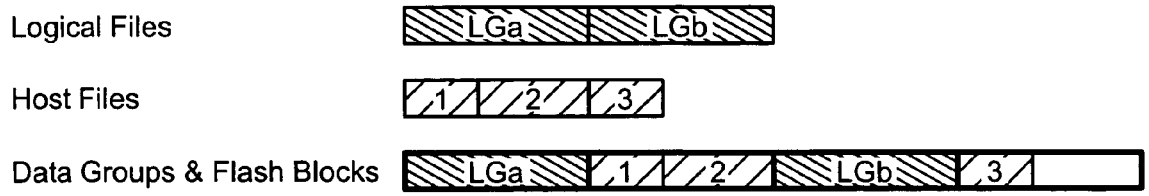
FIG. 20 illustrates a preferred manner of storing both host data files and logical files in physical blocks of memory when implementing the third embodiment of FIG. 18.
Figure 21:
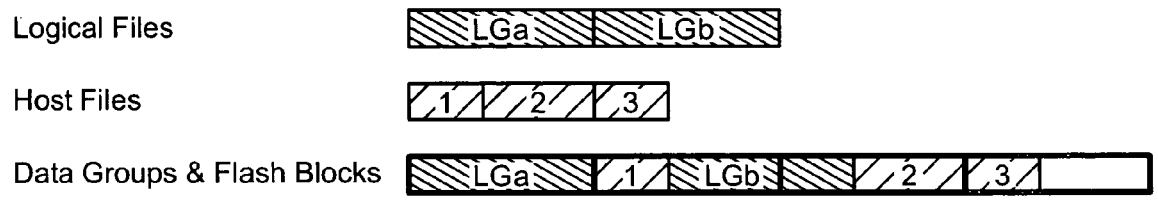
FIG. 21 illustrates another way of storing both host data files and logical files in physical blocks of memory when implementing the third embodiment of FIG. 18.

It is preferred to store data of the host and logical files in different metablocks, as illustrated in FIG. 20. The logical file LGa is stored in the first metablock, the host files 1 and 2 in the next metablock, the logical file LGb in the third metablock and the host file 3 in the last metablock of this illustration. But it is also possible to store both host and data files in the same metablock, an example shown in FIG. 21.

General Applications

Figure 22:
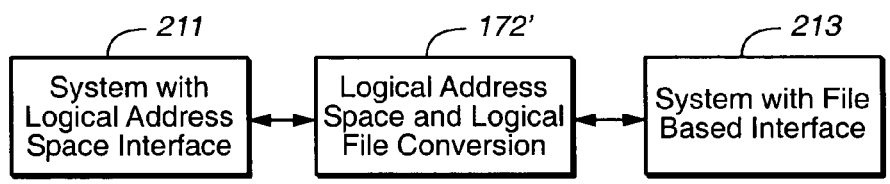
FIG. 22 shows a more general application of the techniques herein between systems having different address interfaces.

The description above is directed primarily to the example of a host system with a logical address space interface and a flash memory system with a file based interface communicating with each other. Although this is an extremely useful example, the present invention is not limited to such a configuration. For example, the techniques work with a wide variety of data storage systems in addition to flash memory, such as magnetic disk drives, optical disk drives, dynamic read-only-memory (DRAM), static read-only-memory (SRAM), read-only memory (ROM), semiconductor magnetic memory, and the like. Indeed, the present invention provides ways to communicate between any two systems that have the incompatible address interfaces. This is illustrated by FIG. 22, wherein a system 211 with an interface of a logical address space and a system 213 with a file based interface communicate with each other through a conversion 172" that has been described above with respect to conversions 172 and 172'. In the examples described above, the system 211 is a host computer while the system 213 is a flash memory system.

CONCLUSION

Although the various aspects of the present invention have been described with respect to exemplary embodiments thereof, it will be understood that the present invention is entitled to protection within the full scope of the appended claims.

It is claimed:

1. A method of operating a memory system, comprising:
receiving a plurality of separate files of data identified by addresses within a continuous logical address space that does not contain an identification of the logical addresses of data within the separate files,
operating with the logical address space divided into a plurality of contiguous logical address groups, wherein individual ones of the plurality of logical address groups contain a predetermined amount of data,
logically addressing the data within the individual logical address groups by a unique group identification and offsets of data within the group, and
mapping in data of the plurality of logical address group into the memory system wherein the memory system includes re-programmable non-volatile semiconductor memory cells divided into non-overlapping units, and wherein the predetermined amount of data of the individual logical address groups equals a data storage capacity of the individual memory cell units.

2. The method of claim 1, wherein the individual memory cell units contain at least one block of memory cells, wherein a block contains a minimum number of memory cells that are erasable together.

3. The method of claim 2, wherein the individual memory cell units contain two or more blocks of memory cells that are logically linked together as a metablock.

4. The method of claim 1, wherein the memory system operates its memory cells to individually store more than one bit of data.

5. The method of claim 1, additionally comprising:
receiving a second plurality of separate files of data identified by unique file identifications and offsets of data within the individual second plurality of files, and
mapping data of the second plurality of files directly into the memory system.

6. The method of claim 5, wherein the memory is partitioned into at least a first partition into which data of the plurality of logical address groups are mapped and a second partition into which data of the second plurality of received files are directly mapped.

7. The method of claim 6, wherein the memory is partitioned into a third partition into which data controlling operation of the memory system are stored.

8. The method of claim 7, wherein the memory is partitioned into a fourth partition that is usable to receive data from either of the plurality of logical address groups or the second plurality of received files.

9. The method of claim 5, wherein data from the plurality of logical address groups and the second plurality of received files are both mapped into a common partition of the memory.

10. The method of claim 9, wherein the memory is partitioned into the common partition and a second partition into which data controlling operation of the memory system are stored.

11. The method of claim 10, wherein the memory is additionally partitioned into a third partitions of erased units of memory cells that are usable to receive data from either of the plurality of logical address groups or the second plurality of received files.

12. A method of operating a re-programmable non-volatile memory system of a type having semiconductor memory cells divided into units of cells and an interface including a logical address space over which a plurality of data files received from a host through the interface are identified, comprising:
operating with the logical address space divided into a plurality of contiguous logical address groups having sizes equal to the storage capacity of the individual units of memory cells, and
maintaining a table for mapping the logical groups into specific ones of the units of memory cells as separate files that individually have a unique file identification and offsets of data within the file.

13. The method of claim 12, additionally comprising:
receiving a second plurality of separate files of data identified by unique file identifications and offsets of data within the individual second plurality of files, and
maintaining a table for mapping the second plurality of files directly into specific units of memory cells within the memory system.

14. A method of operating a non-volatile memory system of a type having memory cells divided into units of cells, comprising:
storing data in the memory system as files addressed by a unique file identification and offsets of data within the file,
in response to receiving host data files from outside of the memory that are addressed by a unique file identification and offsets of data within the file, directly storing the received data files in the memory system by such a file address, and
in response to receiving host data from outside of the memory that are addressed within a logical address space of the memory rather than as a host data file, storing the received host data as memory files of data addressed within predetermined groups of local address ranges, the memory files being stored by a unique file identification and offsets of data within the memory file.

15. The method of claim 14, wherein the units of memory cells within the memory system are partitioned into at least a first group into which host data files are directly mapped and a second group into which the memory data files are directly mapped.

16. The method of claim 15, wherein the units of memory cells within the memory system are partitioned into a third group into which data controlling operation of the memory system are stored.

17. The method of claim 16, wherein the units of memory cells within the memory system are partitioned into a fourth group of erased units of memory cells that are usable to receive either host data files or memory data files.

18. The method of claim 15, wherein the predetermined groups of local address ranges individually include an amount of data equal to the storage capacity of individual units of memory cells.

19. The method of claim 14, wherein the host data files and memory data files are both mapped into a common group of units of memory cells.

20. The method of claim 19, wherein the predetermined groups of local address ranges individually include an amount of data equal to the storage capacity of individual units of memory cells.

21. The method of claim 19, wherein the units of memory cells within the memory system are partitioned into the common group and a second group into which data controlling operation of the memory system are stored.

22. The method of claim 21, wherein the units of memory cells within the memory system arc additionally partitioned into a third group of erased units of memory cells that are usable to receive either host data files or memory data files.

23. The method of claim 14, wherein the predetermined groups of local address ranges individually include an amount of data equal to the storage capacity of individual units of memory cells.

24. Electronic apparatus, comprising:
    a first system having an interface that identifies a first set of data files by unique addresses within a continuous logical address space,
    a second system having an interface that identifies a second set of data files by unique identifications of the files and offsets of data within the individual files, and
    a file converter that divides the continuous logical address space into distinct groups of addresses and identifies data within these groups of addresses as the second set of data files.

25. Apparatus according to claim 24, wherein the file converter divides the continuous logical address space into distinct groups of addresses of the same size, whereby the data files of the second set of data files are also of the same size.

26. A data storage system comprising:
    an addressable memory,
    an operational controller that causes addressed portions of the memory to be accessed for programming and reading data,
    a first interface including a continuous logical address space into which a plurality of host files may be mapped but which does not contain an identification of the addresses within the logical address space occupied by individual host files,
    address translation between (a) unique groups of addresses within the logical address space identified as logical files with a unique file identifier and offsets of data within the file but without regard to logical addresses of host files that occupy the logical address space and (b) addresses of physical portions of the memory, and
    a second interface for communication with a host system of host data logical files addressed by a unique host file identifier and offsets of data within the identified host file.

27. A re-programmable non-volatile memory system comprising:
    an array of memory cells that individually include at least one charge storage element and which is divided into units of memory cells,
    a first address translator between (a) addresses of logical files that individually. include a unique file identifier and offsets of data within the identified file and (b) physical addresses of at least some of the units of memory cells,
    an operational controller that causes said at least some of the units of memory cells to be accessed for programming and reading data of the logical files,
    a first interface including a continuous logical address space into which a plurality of host files may be mapped but which does not contain an identification of the addresses within the logical address space occupied by individual host files,
    a second address translator between (a) groups of addresses within the logical address space identified as logical files with a unique file identifier and offsets of data within the file and
    (b) addresses of logical files of the first address translator, and
    a second interface for communication with a host system of host data logical files addressed by a unique host file identifier and offsets of data within the identified host file.

28. The memory system of claim 27, wherein the second address translator translates addresses between groups of addresses within the logical address space that individually contain the same amount of data as a storage capacity of individual units of memory cells.

29. The memory system of claim 28, wherein the units of memory cells of the array individually include at least one block of memory cells, wherein a block contains a minimum number of memory cells that are erasable together.

30. The memory system of claim 29, wherein the units of memory cells of the array individually include two or more blocks of memory cells that are logically linked together as a metablock.

31. The memory system of claim 27, wherein the operational controller additionally operates to store one of more than two measurable levels of charge on individual charge storage elements that represents the data being stored thereon, thereby to store more than one bit of data on the individual charge storage elements.

32. The memory system of claim 27, wherein the first address translator additionally operates to map addresses of those logical files formed from groups of addresses within the logical address space of the second interface into a different set of memory cell units than addresses of those host logical files passing through the first interface.

33. The memory system of claim 27, wherein the first address translator additionally operates to map addresses of those logical files formed from groups of addresses within the logical address space of the second interface and addresses of those host logical files passing through the first interface into a common set of memory cell units.

\* \* \* \* \*